Figure 1:
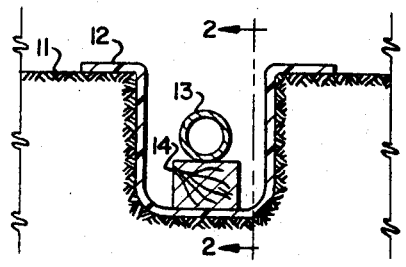

April 30, 1968  H. F. YOUNG  3,380,258
METHOD OF MOLDING INSULATION ABOUT A METAL PIPE
Filed Jan. 22, 1965

INVENTOR:
HOMER F. YOUNG
BY: *Martin S. Baer*
HIS ATTORNEY

# United States Patent Office 3,380,258
Patented Apr. 30, 1968

3,380,258
METHOD OF MOLDING INSULATION
ABOUT A METAL PIPE
Homer F. Young, Houston, Tex., assignor to Shell Oil
Company, New York, N.Y., a corporation of Delaware
Filed Jan. 22, 1965, Ser. No. 427,256
4 Claims. (Cl. 61—72.2)

This invention is directed to a method for insulating articles, intended for use in high-temperature service, with organic insulating material and to the resulting finished articles.

High-temperature service, in this specification, refers to temperatures between about 300° and about 800° F., including temperatures in steam lines. Insulation for pipe used in such high-temperature service is conventionally an inorganic material such as an asbestos product, which has to be installed by hand, piece by piece, and thus adds considerable expense to installation of such lines.

In recent times, foamed or expanded plastic and thermosetting organic materials have been adapted for use as thermal insulation. Such uses are illustrated, for example, in an article in "The Oil and Gas Journal," Mar. 9, 1964, pages 90–91, in which tanks in relatively low-temperature service are insulated by spraying onto the tank a polyurethane foam composition which is built up in multiple passes to provide a desired thickness of insulation.

It has not been suggested heretofore to employ expanded plastic or thermosetting materials in high-temperature service. The known maximum service temperatures of polyurethane foams and epoxy resin foams, for example, are reported to be 250–300° F.; foamed thermoplastic matrials have still lower service temperature ceilings (U.S. Foamed Plastic Markets and Directory, Technomic Publishing Co., Stamford, Conn., 1964, page 33). The only expanded organic materials known heretofore for service at high temperatures are the silicone rubbers which are described on pages 18–21 of the same publication. These materials are very expensive and require oven cure, and are thus obviously not adapted for the provision of cheap thermal insulation which can be applied to steam pipes directly in the field.

It has now been found that a special, controlled method of applying foamable epoxy resin compositions permits the ready and simple insulation of high-temperature service lines directly in the field. It is the main object of this invention to provide an inexpensive method for insulating high-temperature service lines and the like with expanded epoxy resins and to provide, as novel manufactures, articles insulated with epoxy resin and adapted to service at temperatures between about 300° and about 800° F. This invention is particularly suitable for moderately high temperature service, e.g., in the range from 200 to 500° F.

This invention is based on the discovery that when an epoxy resin composition is expanded and at least substantially cured in contact with an article intended for high-temperature service, such as a steam pipe, while said article is at a low temperature, and the article is thereafter heated to its intended service ceiling temperature, the innermost portion of the epoxy resin foam, which was originally in contact with said article, is thermally decomposed, leaving the foam structure essentially intact without excessive charring. A gap is thus created between the surface of the article and the foamed resin if the body of foamed resin is maintained in fixed spatial relation to said article. Thereafter, the epoxy resin is not significantly degraded or decomposed any further; by virtue of remaining rigid and remaining fixedly spaced with relation to said article it serves as excellent thermal insulation. It has been found that insulation can be provided according to this invention much more economically than that conventionally applied to steam pipe in high-temperature service; it is thus particularly adapted for large-scale installation in such systems as steam piping for use in oil fields, and the like.

Figure 2:
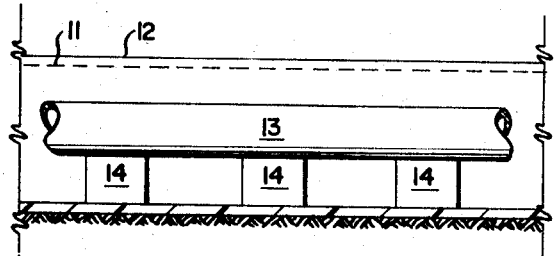
Figure 3:
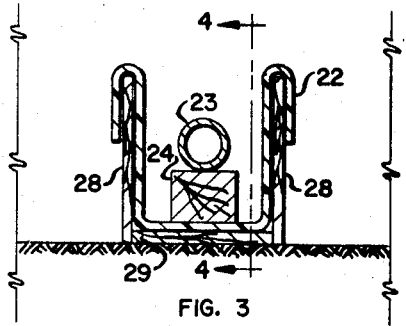
Figure 4:
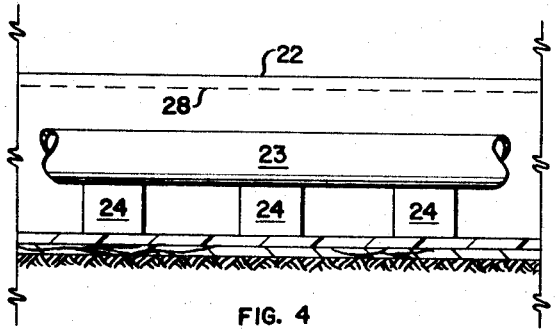
Figure 5A:
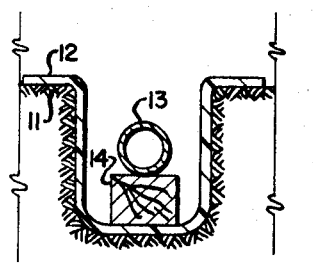
Figure 5B:
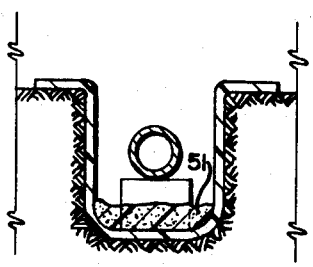
Figure 5C:
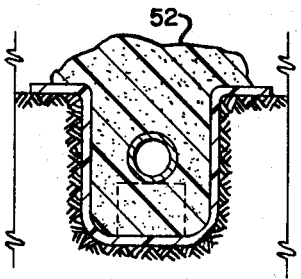
Figure 5D:
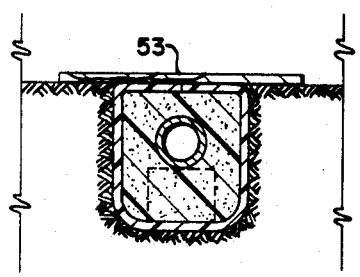
Figure 5E:
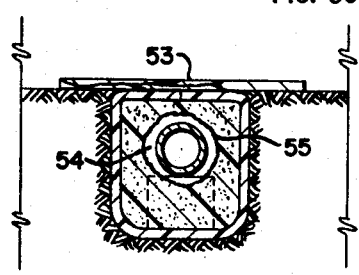

The invention will be further described with reference to the drawing, wherein FIGS. 1 and 2 are two sectional views of a portion of a pipe adapted for insulation according to this invention; FIGS. 3 and 4 are two sectional views of a different arrangement of a portion of pipe adapted for insulation according to this invention; and FIG. 5 consists of five sectional views illustrating the sequence of steps in insulating pipe according to this invention.

For the sake of consistency of nomenclature, the term "epoxy resin" herein refers to the cured thermoset resin composition, obtained by reaction of a "curing agent" with a "polyepoxide." The term "polyepoxide" refers to compounds or mixtures of compounds containing an average of more than one oxirane group per molecule, sufficient to permit cross-linking through the oxirane group to form useful thermoset resins. The term "curable composition" refers to a polyepoxide-containing liquid mixture which is capable of being cured to thermoset resin after being mixed with a curing agent. The term "curing composition" refers to a curing agent-containing composition, usually a liquid, which, upon being admixed with a curable composition, causes the mixture to cure to form an epoxy resin. The mixture of curable composition and curing composition is designated "curable mixture."

Epoxy resins are a family of thermoset resins which have achieved a variety of commercial uses. They are useful, inter alia, in so-called "foamed," "expanded," or "cellular" condition. Cured compositions of this type are generally referred to herein as foamed epoxy resins, foamed epoxy resin compositions, or epoxy resin foams.

The production of epoxy resins in general is described in numerous patents, and in books such as "Epoxy Resins—Their Applications and Technology" by Lee et al., McGraw-Hill Book Co., Inc., 1957.

Foamed epoxy resins may be produced by several techniques in which expansion or blowing of the foamable curable mixture immediately precedes, or overlaps in time with, curing of the expanded composition. In the preferred mode of this invention foamed epoxy resins are produced by the so-called "foam-in-place" technique in which a liquid composition comprising polyepoxides and a foaming agent or blowing agent, such as chlorofluorocarbon, is intimately mixed with a curing composition, and is thereafter immediately placed into the location where the foam is desired; there it expands by virtue of the action of the heat released from the curing reaction on the blowing agent. Typical polyepoxide compositions and curing agents suitable for foam-in-place application are known. They are described, for example, in U.S. 3,051,665 to Wismer et. al. and in British Patent No. 912,967. From these and related disclosures, persons skilled in the art of producing foamed epoxy resins will know what polyepoxides, foaming agents and the like are suitable for use in producing foamed epoxy resins and only brief mention will be made herein of this known background of the invention. Foamable epoxy resin compositions are commercially available; see the above-mentioned "U.S. Foamed Plastic Markets and Directory."

A second method of preparing foamed epoxy resin compositions is the so-called pressure-dispensed method in which a curable epoxy resin composition is admixed under pressure with a volatile liquid or a gaseous foaming agent and the resulting mixture is admixed with a curing composition and is then dispensed by releasing it from a high-pressure zone into a low-pressure zone, ordinarily one held at atmospheric pressure. The resulting mixture is dispensed in the form of a thick froth which cures as a result of the action of the curing agent on the resin. The heat released during the curing reaction generally causes some further expansion of the frothy mixture. Polyepoxide compositions and curing agents suitable for use in such a method are described, inter alia, in U.S. Patent 3,154,504 of Carey and Jones.

Another group of foamable polyepoxide compositions are dry powders containing suitable polyepoxide, curing agents and chemically decomposable blowing agents. These powdered foamable compositions are employed by placing them in the space where the foam is desired and thereafter applying sufficient heat to melt the powder and initiate the curing and foaming reaction. Powder mixtures are generally less preferred for the method of this invention since initiation of the foaming and curing reaction requires application of external heat.

The polyepoxides employed in preparing curable compositions may be saturated or unsaturated, aliphatic, cycloaliphatic, aromatic or heterocyclic and may be substituted with substituents such as chlorine, hydroxyl groups, ether radicals and the like. They may be monomeric or polymeric. They may be of a single type or or may be mixtures of several different types or molecular weights.

When the foamable composition is a liquid, all the epoxy compounds therein may be normally liquid or some may be normally solid. For purposes of describing and claiming this invention, normally liquid polyepoxides are those having a Durrans mercury method softening point up to about 30° C.; normally solid polyepoxides are those which have a higher softening point.

The polyepoxides that are preferred as major ingredient of the foamable compositions are the polyglycidyl ethers, and particularly the normally liquid polyglycidyl ethers, of polyhydric phenols or polyhydric alcohols. The term "polyhydric" comprises compounds having two or more hydroxyl groups per molecule. Especially preferred are the polyglycidyl ethers of polyhydric phenols obtained by reacting epichlorohydrin with 2,2-bis(4-hydroxyphenyl)propane. The preparation of such polyepoxides is shown, for example, in U.S. 2,633,458 to Shokal. Polyether A and polyether B of that patent are typical of polyepoxides used with the curing agents of this invention.

Other useful polyepoxides are illustrated in some detail inter alia in the above-mentioned book by Lee et al.

A second essential ingredient of expandable curable compositions employed with the curing agents of this invention is a "blowing agent." The blowing agent should be compatible with the polyepoxide composition while the latter is in the liquid state and should, at the elevated temperature which results from the exothermic curing reaction, liberate a gas or vapor which causes the foaming effect. Blowing agents for use in this invention may be "decomposable" chemicals, usually solids, which upon being heated to a suitable temperature decompose with liberation of a gas such as nitrogen or $CO_2$.

In the preferred mode of this invention, the blowing agent is "vaporizable." It may be a liquid or liquid mixture, or any compound which is sufficiently soluble in the polyepoxide composition so that it does not vaporize therefrom as long as the composition itself is at its storage temperature and pressure, which is ordinarily atmospheric temperature and pressure, but is caused to vaporize at elevated temperatures.

The boiling point of vaporizable blowing agent is preferably between about −30° and 100° C., and is more preferably between about 0° and about 50° C. Vaporizable blowing agents having boiling points in the higher part of the range, e.g., from 60° to 100° C. generally require some extraneous heat to secure full expansion, in additon to the heat developed during the curing process of the mixture. If desired, mixtures of blowing agents may be employed in which a lower boiling fluid provides the initial expansion and a higher boiling fluid provides further substantial expansion as the temperature of the total mixture rises.

The chemical composition of the vaporizable blowing agents is not of importance so long as they are inert, i.e., not reactive with the remaining components of the resin mixture. Suitable fluids, for example, are hydrocarbons such as pentanes, hexanes, cyclohexane, petroleum ether or the like, and substituted hydrocarbons such as halo-hydrocarbons. Some compounds which can be dissolved in the polyepoxide mixtures to provide expansion by vaporization at elevated temperatures may have relatively high melting points, so that they are normally solids. The term "vaporizable fluids" includes such compounds when present in solution in the expandable composition.

Preferred vaporizable fluids are polychlorofluoroalkanes. Particularly preferred are those polychlorofluoromethanes which have boiling points in the preferred range, e.g., trichlorofluoromethane.

Another group of blowing agents, which may be employed alone or in conjunction with the vaporizable blowing agent, are those which decompose upon heating to liberate a gas. A number of such blowing agents are well-known and some are commercially sold for use in the production of foamed plastics or resins. These materials include inorganic compounds which liberate carbon dioxide and organic chemicals which decompase to liberate nitrogen. They are described, for example, in U.S. Patent 2,739,134 to Parry.

The curing compositions employed with liquid curable polyepoxide compositions generally consist of a curing agent in solution in a suitable solvent which may be a hydrocarbon or a polar organic material such as, for example, a polyglycol, but which may also be selected from other compounds for special purposes such, for example, as partially halogenated esters of phosphoric acid, e.g., tris(2,3-dibromopropyl)phosphate or tris(2,3-dichloropropyl)phosphate.

For use in the foam-in-place applications the preferred curing agent is boron trifluoride or a complex of boron trifluoride such as, for example, a boron trifluoride etherate. Such compositions are described in detail in said Wismer et al. patent and said British Patent No. 912,967 and they are commerically available. For pressure-released foam applications the preferred curing agents are amino compounds such as described in said Carey et al U.S. Patent 3,154,504. Many other curing agents or polyepoxides are known and may be employed in expandable resin compositions.

Other ingredients generally employed in expandable resin compositions are surface-active agents, which provide improved foam structure. In the pressure dispensed compositions a thixotrophic agent is generally present. Other materials which may be present are plasticizers, pigments, fillers and the like and chemically reactive ingredients such as reactive diluents, e.g., monoepoxides such as butyl- or phenylglycidyl ether.

Preferred methods for producing foamed epoxy resin compoistions are described in substantial detail in the above-mentioned U.S. patents and British patent.

Generally, the suitable methods comprise combining two liquids, namely (A) a curable composition which contains a suitable polyepoxide, a vapor-generating agent, and may contain any other of the above-referred-to ingredients desired to be included in the foamed resin composition, except the curing agent, and (B) a liquid curing composition consisting essentially of a suitable curing agent and a solvent suitable therefor. The curable polyepoxide composition and liquid curing composition are rapidly and completely blended, with suitable foam nucleation provision, and the resulting liquid mass is then placed in the location where the foam resin is desired. This may be accomplished by spraying. Alternatively, the foamable composition, prepared under pressure, is admixed with the curing agent and then dispensed by release of pressure.

Exothermic curing reactions are initiated upon blending of the curing composition with the curable polyepoxide composition, resulting in the liberation of heat, which raises the temperature of the mixture. The proportions and types of components are selected such that the temperature of the blend, which originally is below that at which the vapor is generated, rises to a point at which vaporization of the fluid contained in the polyepoxide mass occurs, or at which decomposable vapor generating compounds decompose, with the result that vapor is liberated and the mixture is thus expanded. The curing reaction proceeds while the mass is in an expanded and heated condition, the polyepoxide gelling and curing to the desired hard resin during this period.

In general, the curing reaction is substantially complete within minutes of the initiation thereof. The curing of $BF_3$-catalyzed foam-in-place mixtures, for example, is about 95% complete in about 8 minutes.

In accordance with this invention, the initial curing reaction takes place either without addition of extraneous heat or with extraneous heating to temperatures not above about 160° F. After the curing reaction is at least about 95% and preferably about 99–100% complete, or, conveniently after at least about 30 minutes and suitably after 1–2 hours, the insulated pipe or other article is preferably brought to its expected maximum service temperature and is held at that temperature for at least a brief time, e.g., 1 or 2 hours or more. This results in a gradual thermal degradation of the epoxy resin structure which immediately surrounds the insulated article. No further significant decomposition of the insulated structure is generally experienced. The distance from the surface of the pipe or article to the inner surface of the remaining foamed resin is generally from 1/8 to 1/4″. It will be understood that it is not necessary to bring the article to its maximum expected service temperature in a single operation immediately after the structure has been insulated. Rather, the pipe or other article may merely be placed in service at its normal temperatures, provided that the foam is substantially completely cured when temperatures of about 300° F. are exceeded. It is sometimes preferred to heat the article to its maximum service temperature gradually over a period of, for example, 1 hour to 1 day, to facilitate gradual and even degradation of the innermost foam layer.

The method of insulating pipe according to this invention is further illustrated by reference to the drawing. FIGS. 1 and 2 of the drawing illustrate a method of installing pipe in a ditch, such as in an oil field installation. FIG. 1 is a section through the ditch and FIG. 2 is a lengthwise section along lines 2—2 of FIG. 1. As illustrated, an open trench or ditch is dug in the ground, whose surface is represented by 11. The ditch is suitably lined with a water-impermeable plastic sheet 12. The pipe 13 to be insulated is supported within the ditch, spaced away from the bottom and sides thereof, suitably by spacers such as blocks 14 which may be made of asbestos insulating material or of other suitable thermally non-conductive material which does not degrade excessively at the maximum operating temperature of the pipe. The blocks may be made of wood or of wood upon which is placed a thin sheet of an asbestos material. Any other suitable method of permanently spacing the pipe in relation to the ground may be employed.

A second method of installing an insulated pipe according to this invention on the surface of the ground is illustrated in FIGS. 3 and 4, which are again a cross-section and a longitudinal section of a portion of a pipe. The surface of the ground is represented by 21. A temporary wooden trough having sides 28 and bottom 29 is built on the surface of the ground. The plastic liner 22, pipe 23 and support 24 correspond to the items number 12, 13 and 14 in FIGS. 1 and 2.

FIG. 5 illustrates the sequence of steps in insulating pipe in an open ditch corresponding to that illustrated in FIGS. 1 and 2. FIG. 5A shows the pipe placed on a suitable support in the ditch. FIG. 5B shows a liquid foamable composition 51 poured into the bottom of the ditch. FIG. 5C shows the installation after the plastic composition has expanded, filled the ditch, overflowed, and hardened. FIG. 5D shows the appearance after the excess of plastic has been cut off by a simple means such, for example, as a hot wire, the plastic liner has been folded over the top of the foamed resin and sealed, e.g., by a heat seal or by means of an adhesive, and the ditch has been covered with a permanent cover such as wooden planks or metal plates 53. FIG. 5E illustrates the appearance after the pipe has been gradually brought to its maximum service temperature and the epoxy resin composition immediately surrounding the pipe has been decomposed, leaving open space 54 and a mildly charred or decomposed layer 55, which provides protection for the outer foam layer.

In a typical outdoor installation, a steam line system consisting of 3-inch and 4-inch pipe, laid on the ground and normally operating at 410° to 440° F., is insulated as illustrated in FIGS. 3 and 4 with a resin foam prepared by mixing a foamable mixture of 100 parts by weight of Composition A with 10 parts by weight of curing Composition B, immediately placing the mixture in a trough surrounding the pipe, and permitting it to cure without application of external heat.

The compositions, in parts by weight are as follows:

Composition A:
    Liquid polyepoxide _____ 80
    Reactive surfactant _____ 3
    Trichlorofluoromethane _____ 17

Composition B:
    $BF_3$-etherate _____ 7
    Polyethylene glycol _____ 30
    Tris-dibromopropyl phosphate _____ 63

Several hours after the mixture has been placed in the trough it is smoothed off and covered with plastic sheet as weather protection. Then the temperature of the pipe is gradually raised to the operating level, over a period of 1 to 2 hours. Thereafter the system is normally operated. After several months of service the resin foam is found to continue to serve as effective thermal insulation. Temperatures 2 inches radially outward from the pipe surface are in the range from 75° to 128° F., where ambient air temperatures themselves often reach 90 to 100° F.

The present invention is not limited by the illustrative description and examples but only by the appended claims. It will be readily apparent that numerous related methods other than those of the drawing may be employed for providing the articles of this invention, i.e., the insulated pipes or other vessels for high temperature service to which epoxy resin foam has been applied and fixedly spaced with respect to the pipe or vessel, and in which, after at least substantial curing of the epoxy resin foam, the article has been brought to its maximum service temperature, thus thermally degrading the portion of epoxy resin immediately adjacent to the article. For example, pipe may be spaced within a plastic-retaining surface which completely surrounds the pipe, such as a thin plastic pipe of larger diameter or a sheet metal liner or the like, with openings provided at intervals for injection of foamable resin mass. To provide a simple nomenclature, all such surrounding configurations, whether open, such as ditches and troughs, or closed, such as pipe, are referred to herein as "shells."

While the installations have been illustrated with reference to use of water-impermeable plastic sheet lining the shells, other equivalent means may be employed. For example, a ditch may be lined with asphalt or its equivalent, e.g., by spraying it with an asphalt emulsion or cutback before installing the pipe; or a finished foamed coating be sprayed or painted with a suitable cover material, such as a mastic.

In a further modification, the shell may be omitted altogether, as in insulating a vessel, and the foamable or foamed mixture applied by spraying it onto the vessel to be insulated, in this method, suitable means for retaining this cured foam in fixed spatial relationship to the vessel must be affixed to the surface of the vessel. These may be in any convenient form, such as thermally non-conductive projections, e.g., ceramic hooks or spikes, projecting from the surface for a distance less than that of the completed insulation.

Since the foamable epoxy resin composition and curing compositions suitable for use in this invention are now well-known and are commercially available, it is not necessary to describe them herein in detail. The above referred-to patents and text are incorporated herein by reference for the purpose of including the description of typical formulations.

I claim as my invention:

1. A method of insulating metal pipe having high service temperatures in the range from 300° to 800° F. which comprises:
    (a) spacing said pipe within a shell by means of thermally non-conductive spacers;
    (b) introducing into said shell, along said pipe, a mixture which, upon curing, is converted into a rigid cellular epoxy resin which surrounds said pipe and fills said shell;
    (c) maintaining the temperature of said pipe and shell at no more than about 160° F. for a sufficient time to permit said resin to be substantially completely cured; and
    (d) thereafter increasing the temperature of said pipe up to its maximum intended service temperature in said range.

2. The method according to claim 1 wherein said mixture comprises a polyepoxide, a curing agent therefor, and a volatile blowing agent, mixed immediately before being placed into said shell, and adapted to expand and cure after being placed in said shell.

3. The method according to claim 1 wherein said mixture consists of a pre-expanded curable mixture of polyepoxide and curing agent therefor, the expansion thereof having been secured by dissolving a vaporizable expanding agent therein under pressure and releasing the pressure as the resin mixture is placed into said shell.

4. A method of installing in a field installation insulated metal pipe having high service temperatures in the range from 300° to 800° F. which comprises:
    (a) digging a trench adapted to receive said pipe and exceeding the size of said pipe by the amount of desired insulation;
    (b) lining said trench with a non-porous water-resistant material;
    (c) spacing said pipe in said trench by means of suitable thermally non-conductive supports;
    (d) introducing into said trench, along said pipe, a mixture which, upon curing, is converted into a rigid cellular epoxy resin which surrounds said pipe;
    (e) thereafter, maintaining the temperature of said pipe at no more than about 160° F. for a sufficient time to permit the cure of said resin to be substantially complete;
    (f) thereafter increasing the temperature of said pipe up to its service temperature in said range;
    (g) and, after said cure is at least substantially complete, removing an undesired excess of resin foam and covering the exposed surface of the foam with a weather-resistant material.

References Cited

UNITED STATES PATENTS

| 1,002,932 | 9/1911 | Richards | 138—149 X |
| 2,972,968 | 2/1961 | Stafford | 264—35 X |
| 3,206,867 | 9/1965 | Ziegler | 34—22 |
| 3,258,512 | 6/1966 | Flower et al. | 264—45 |

FOREIGN PATENTS

| 338,811 | 7/1921 | Germany. | |

ALEXANDER H. BRODMERKEL, *Primary Examiner.*

P. E. ANDERSON, *Assistant Examiner.*